United States Patent Office 3,637,575
Patented Jan. 25, 1972

3,637,575
PROCESS FOR HOMOGENEOUSLY COLORING COPOLYMERS OF TRIOXANE
Edgar Fischer, Frankfurt am Main, and Karl-Heinz Häfner, Bad Orb, Germany, assignors to Farbwerke Hoechst Aktiengesellschaft vormals Meister Lucius & Bruning, Frankfurt am Main, Germany
No Drawing. Continuation-in-part of abandoned application Ser. No. 644,095, June 7, 1967. This application Aug. 18, 1969, Ser. No. 851,042
Claims priority, application Germany, June 18, 1966, F 49,496
The portion of the term of the patent subsequent to July 8, 1986, has been disclaimed
Int. Cl. C08f 3/40
U.S. Cl. 260—37 P    7 Claims

ABSTRACT OF THE DISCLOSURE

Thermostable colored polyacetals are prepared by reacting a copolymer of trioxane containing aldehyde groups with a disperse dyestuff. They are suitable for coloring uncolored polyacetals and they are especially processed into colored blown films and transparent colored shaped articles.

---

This application is a continuation-in-part of application Ser. No. 644,095, filed June 7, 1967 and now abandoned.

The present invention provides a process for preparing thermostable colored polyacetals.

It is known that copolymers of trioxane can be pigment-colored by adding appropriate coloring pigments to the polymers in the melt. For obtaining an unobjectionable color in transparent and thin-walled articles, the pigmenting of copolymers of trioxane only provides unsatisfactory results. It is also known that disperse dyestuffs are only absorbed by the surfaces of polyacetals, i.e. no homogeneous coloring is obtained so that articles which are subject to wear quickly take a poor aspect.

It is, moreover, known that the incorporation of certain hydroxy-anthraquinones into the melt of polyacetals yields thermoplastic materials of a weak color and with stabilizing properties. Although finely divided, the dyestuff is not chemically bound to the polymer. In these cases, the dyestuff has the properties of a very finely divided pigment and can be extracted by means of corresponding solvents. This process for coloring is therefore only applicable to a limited extent, quite apart from the fact that only a few tints (yellow and red) are available.

In molding compositions, pigments are more desirable than dyes for polyacetal resins because of their stability against the temperatures employed in fabrication, and because of their resistance to extraction by solvents (cf. M. Sittig, Petroleum Refiner, vol. 41, No. 11 (1962), page 166).

In most cases, however, the use of normal pigments brings about a considerably reduced stability of the polymer under thermal strain, in comparison with unpigmented polyacetals so that only a few types still provide reasonable stabilities.

It has now been found that thermostable colored polyacetals can be prepared by reacting copolymers of from 70 to 99.99% by weight of trioxane, 0 to 10% by weight of cyclic ethers and/or cyclic acetals and 0.01 to 20% by weight of compounds containing aldehyde groups and corresponding to the general formula $$R_1-R_2-CHO$$

in which $R_1$ represents a 2,3-epoxy-propyloxy-radical or a 1,3-dioxolano-4-methyloxy radical and $R_2$ represents an aromatic hydrocarbon radical containing 6 or 10 carbon atoms, which may be substituted by $(A)_x$ and/or $(B)_y$, A representing an alkyl radical containing from 1 to 6 carbon atoms, and B representing an alkoxy radical containing from 1 to 6 carbon atoms, $x$ being zero or an integer from 1 to 4, $y$ being zero or an integer from 1 to 4 and $x+y$ being less than 5, with disperse dyestuffs in such an amount that 0.1 to 2 mols of dyestuff are used per 1 mol of the aldehyde groups in the polymer.

The cyclic comonomers of trioxane are cyclic ethers having 3 to 5 ring members, preferably epoxides, or cyclic acetals having 5 to 9 ring members. It is preferred to use cyclic ethers or cyclic acetals of the general formula

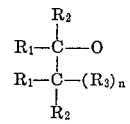

in which $R_1$ and $R_2$ represent a hydrogen atom, an alkyl- or a halogen-alkyl radical, $R_3$ represents a methylene- or oxy-methylene radical which may be substituted by an alkyl- or a halogen-alkyl group, and $n$ is zero or an integer of from 1 to 3. The above-mentioned alkyl radicals contain from 1 to 5 carbon atoms and may be substtiuted by 1 to 3 halogen atoms, preferably chlorine atoms.

Suitable cyclic comonomers of trioxane are, for example ethylene oxide, propylene oxide, epichlorohydrin, glycol formal (=1,3-dioxolane), butane-diol-(1,4) formal (=1,3-dioxepane), butene-diol-(1,4) formal (=1,3-dioxa-cycloheptene-(5)), phenyl glycidyl ether and butane-diol-(1,4) diglycidyl ether.

The copolymers of trioxane used according to the invention are prepared by copolymerization of trioxane and the comonomers as defined above in the presence of a cationic catalyst at a temperature within the range of from $-50$ to $+110°$ C. in the melt, in solution or in suspension. As catalysts there are advantageously used Lewis acids, preferably boron trifluoride, in an amount of from 0.0001 to 1.0%, calculated on the total weight of the monomer mixture (cf. Belgian patent specification No. 683,446).

Suitable dyestuffs are disperse dyestuffs of the anthraquinone series and azo dyestuffs containing one or two amino-, hydroxy-, nitrile- or NH-acyl groups, in which case one to four of the mentioned reactive groups may be present.

Appropriate dyestuffs are
1-amino-2-phenoxy-4-hydroxy-anthraquinone,
1,4-diamino-2,3-diphenoxy-anthraquinone,
1-amino-2-methoxy-4-hydroxy-anthraquinone,
1,5-dihydroxy-4-(N-hydroxy-methyl-amino)-8-amino-anthraquinone,
1,5-diamino-2(3)-bromo-4,8-dihydroxy-anthraquinone,
1,8-diamino-4,5-dihydroxy-anthraquinone,
1-amino-naphthalene-4-azobenzene,
3-nitrophenyl-azo-3-(1-methyl-4-hydroxy-quinolone-(2)),
2-cyano-4-nitro-phenyl-azo-4-cyanoethylamino-benzene and
2-bromo-4,6-dinitro-phenyl-azo-2-acetylamino-4-di-(β-acetoxyethyl)-amino-5-ethoxy-benzene.

Depending on the tinctorial power of the dyestuff and on the coloration degree desired, the dyestuffs are used in an amount of from 0.1 to 2 mols of dyestuff per 1 mol of the compound containing aldehyde groups, which is incorporated into the copolymer.

The reaction is carried out in suspension using a mixture of water and an organic solvent miscible with water as suspending agent. As solvents miscible with water there are used aliphatic alcohols having 1 to 6 carbon atoms, for example methanol, ethanol, propanol and hexanol, aliphatic ketones, for example acetone, or cyclic ethers, for example 1,4-dioxane and tetrahydrofurane. The ratio of water to organic solvent ranges from 95:5 to 5:95 parts by volume, preferably from 70:30 to 30:70 parts by volume.

The reaction is carried out at temperatures in the range of from 0 to 150° C., while stirring. Temperatures ranging from 100 to 150° C. are applied when the reaction is carried out under pressure. It is, however, preferable to carry out the reaction at a temperature in the range of from 40 to 100° C., while stirring.

The polyacetals colored according to the invention possess an excellent thermostability and show an increased ratio of the melt index values $I_{20}/I_2$, measured according to ASTM 1238–52. They are preferably used as concentrates suitable for coloring uncolored polyacetals. They are especially suitable for working up by extrusion processes, for example for preparing thermostable colored blown films, but they can also directly be processed into colored shaped articles which are distinguished by a particularly high transparency. The polyacetals of the invention are, furthermore, characterized in that they contain so to speak thermostabilized dyes because of the chemical reaction of the dyes with the polyacetal having aldehyde groups. This feature of the polyacetals of the invention is an important advantage in comparison with polyacetals without aldehyde groups having dyes incorporated which dyes may decompose at the processing temperatures.

The following examples serve to illustrate the invention, but they are not intended to limit it thereto.

EXAMPLES (1) 20 grams of polyacetal powder obtained from 93 grams of trioxane, 2 grams of ethylene oxide and 5 grams of p-glycidoxy-benzaldehyde were suspended together with 0.3 gram of 1-amino-2-methoxy-4-hydroxy-anthraquinone in a mixture of 500 milliliters of water and 50 milliliters of ethanol and the whole was then refluxed for one hour while vigorously stirring. The polymer was filtered with suction when hot, boiled with acetone and washed with acetone until the filtrate remained colorless. Sheets compression-molded at 190° C. had a deep-red color.

A sample of the colored polymer was stabilized with 0.7% by weight of bis(2-hydroxy-3-tert.-butyl-5-methylphenyl)-methan and 0.2% by weight of dicyano-diamide and was subjected to a thermal degradation at 230° C. for 45 minutes. The loss in weight ($K_D$) was 0.0200% per minute.

The colored polyacetal showed a melt index value of $I_2=1.2$ grams/10 minutes and of $I_{20}=80$ grams/10 minutes, i.e. the ratio of melt index values is $I_{20}/I_2=70$. In comparison therewith an uncolored copolymer of 98% by weight of trioxane and 2% by weight of ethylene oxide produced a ratio of melt index values $I_{20}/I_2=30/1.2=25$.

The following examples were carried out in the same manner as described in Example 1 while using different dyestuffs.

| Example | Dyestuff | $K_D$[1] |
|---|---|---|
| (2) | 1-amino-2-phenoxy-4-hydroxy-anthraquinone. Sheets molded at 190° C. had a brick-red color. | 0.0207 |
| (3) | 1,4-diamino-2,3-diphenoxy-anthraquinone. Sheets molded at 190° C had a deep-violet color. | 0.0241 |
| (4) | 1,8-diamino-4,5-dihdroxy-anthraquinone. Sheets molded at 190° C had a dark blue color. | 0.0179 |
| (5) | 2-bromo-4,6-dinitrophenyl-azo-2-acetylamino-4-di(β-acetoxyethyl)-amino-5-ethoxy-benzene. Sheets molded at 190° C. had a blue color. | 0.0272 |
| (6) | 3-nitrophenyl-azo-3-(1-methyl-4-hydroxy-quinolone-(2)). Sheets molded at 190° C had a yellow color. | 0.0257 |
| (7) | 2-cyano-4-nitrophenyl-azo-4-cyanoethylamino-benzene. Sheets molded at 190° C. had a red color. | 0.0243 |
| (8) | 20 grams of a polyacetal obtained from 93 grams of trioxane, 2 grams of ethylene oxide and 5 grams of p-glycidoxy-benzaldehyde, were suspended together with 0.2 gram of 1-aminonaphthalene-4-azobenzene in a mixture of 500 milliliters of water and 250 milliliters of ethanol and the suspension was refluxed for one hour while vigorously stirring. The polymer was suction-filtered when hot, boiled with acetone and washed with acetone until the filtrate remained colorless. Sheets molded at 190° C. had a golden-yellow color. | 0.0182 |

[1] Loss in weight, percent per minute.

What is claimed is:

1. A process for preparing thermostable colored polyacetals, which comprises reacting copolymers of from 70 to 9.99% by weight of trioxane, from 0 to 10% by weight of a cyclic ether having 3 to 5 ring members and/or a cyclic acetal having 5 to 9 ring members and from 0.01 to 20% by weight of compounds containing aldehyde groups and corresponding to the general formula $$R_1\text{—}R_2\text{—}CHO$$

in which $R_1$ represents a 2,3-epoxy-propyloxy radical or a 1,3-dioxolano-4-methyloxy-radical and $R_2$ represents an aromatic hydrocarbon radical having 6 or 10 carbon atoms, which is substituted by $(A)_x$ and/or $(B)_y$, A being an alkyl radical having from 1 to 6 carbon atoms and B being an alkoxy radical having from 1 to 6 carbon atoms, $x$ being zero or an integer from 1 to 4, $y$ being zero or an integer from 1 to 4 and $x+y$ being less than 5, with 0.1 to 2 mols, calculated on 1 mol of the aldehyde groups in the polymer, of a disperse dyestuff at temperatures in the range of from 40° C. to 100° C., the reaction components being suspended in a mixture of water and an organic solvent miscible with water.

2. The process of claim 1, wherein the cyclic ethers and/or cyclic acetals used are compounds of the general formula

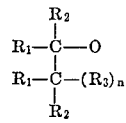

in which $R_1$ and $R_2$ each represents a hydrogen atom, an alkyl or halogen-alkyl radical, $R_3$ a methylene or oxymethylene radical which may be substituted by an alkyl or halogen-alkyl radical and $n$ is zero or an integer of from 1 to 3.

3. The process of claim 1, wherein the cyclic ethers used are epoxides.

4. The process of claim 1, wherein the cyclic ethers and/or cyclic acetals used are selected from ethylene oxide, propylene oxide, epichlorhydrin, glycol formal, butane-diol-(1,4) formal, butene-diol-(1,4) formal, phenyl glycidlyl ether and butane-diol-(1,4) diglycidyl ether.

5. The process of claim 1, wherein the disperse dyestuff used is an anthraquinone dyestuff or an azo dyestuff, each of which contains one or two amino-, hydroxy-, nitrile-, or NH-acyl groups of which a total of from 1 to 4 may be present.

6. Thermostable colored polyacetals prepared by the process of claim 1.

7. A process for preparing thermostable colored polyacetals which comprises reacting copolymers of from 70 to 99.99% by weight of trioxane, from 0 to 10% by weight of a cyclic ether having 3 to 5 ring members and/or a cyclic acetal having 5 to 9 ring members and from 0.01 to 20% by weight of compounds containing aldehyde groups and corresponding to the general formula $$R_1\text{—}R_2\text{—}CHO$$

in which $R_1$ represents a 2,3-epoxy-propyloxy radical or a 1,3-dioxolano-4-methyloxy radical and $R_2$ represents an aromatic hydrocarbon radical having 6 or 10 carbon atoms, which is substituted by $(A)_x$ and/or $(B)_y$, A being an alkyl radical having from 1 to 6 carbon atoms and B being an alkoxy radical having from 1 to 6 carbon atoms, $x$ being zero or an integer from 1 to 4, $y$ being zero or an integer from 1 to 4 and $x+y$ being less than 5, with 0.1 to 2 mols, calculated on 1 mol of the aldehyde groups in the polymer, of a disperse dyestuff selected from 1,5-diamino-2(3)-bromo-4,8-dihydroxy anthraquinone,
1-amino-2-phenoxy-4-hydroxyl-anthraquinone,
1,4-diamino-2,3-diphenoxy-anthraquinone,
1-amino-2-methoxy-4-hydroxyl-anthraquinone, 1,5-dihydroxy-4-(N-hydroxy-methyl-amino)-8-amino-anthraquinone,
1,8-diamino-4,5-dihydroxy-anthraquinone,
1-amino-naphthalene-4-azobenzene,
3-nitrophenyl-azo-3-(1-methyl-4-hydroxyl-quinolone-(2)),
2-cyano-4-nitrophenyl-azo-4-cyanoethyl-amino-benzene, and
2-bromo-4,6-dinitrophenyl-azo-2-acetylamino-4-di(beta-acetoxyethyl)-amino-5-ethoxy-benzene at temperatures in the range of from 0° to 150° C., the reaction components being suspended in a mixture of water and an organic solvent miscible with water.

References Cited
UNITED STATES PATENTS

| | | | |
|---|---|---|---|
| 3,046,249 | 7/1962 | Hermann et al. | 260—37 ALO |
| 3,134,636 | 5/1964 | Singleton | 260—37 ALO |
| 3,454,528 | 7/1969 | Häfner et al. | 260—67 FP |

MORRIS LIEBMAN, Primary Examiner

S. M. PERSON, Assistant Examiner

U.S. Cl. X.R.

260—37 AL